United States Patent [19]
Enokizono et al.

[11] Patent Number: 5,580,470
[45] Date of Patent: Dec. 3, 1996

[54] OUTPUT WAVEFORM CONTROL DEVICE

[75] Inventors: Hitoshi Enokizono, Yamanashi; Nobuaki Iehisa, Mishima, both of Japan

[73] Assignee: Fanuc, Ltd., Minamitsuru-gun, Japan

[21] Appl. No.: 399,653

[22] Filed: Mar. 7, 1995

[30] Foreign Application Priority Data

Mar. 31, 1994 [JP] Japan ..................................... 6-062699

[51] Int. Cl.$^6$ .................................................... B23K 26/00
[52] U.S. Cl. ................................. 219/121.61; 364/474.08
[58] Field of Search ........................... 219/121.6, 121.61, 219/121.62; 364/474.08; 372/25, 30, 31

[56] References Cited

U.S. PATENT DOCUMENTS

| | | | |
|---|---|---|---|
| 4,592,057 | 5/1986 | Comerford | 372/31 |
| 4,866,243 | 9/1989 | Sakane et al. | 219/121.62 |
| 4,890,291 | 12/1989 | Yamazaki | 372/30 |
| 5,041,716 | 8/1991 | Wakabayashi | 219/121.62 |
| 5,128,601 | 7/1992 | Orbach et al. | 372/30 |
| 5,317,578 | 5/1994 | Ogou | 372/31 |

FOREIGN PATENT DOCUMENTS

| | | | |
|---|---|---|---|
| 164751 | 12/1985 | European Pat. Off. | 372/25 |
| 62-24886 | 2/1987 | Japan | 219/121.61 |
| 64-2791 | 1/1989 | Japan | 219/121.62 |
| 1-277220 | 11/1989 | Japan | 372/30 |
| 95/01851 | 1/1995 | WIPO | 219/121.61 |

*Primary Examiner*—Geoffrey S. Evans
*Attorney, Agent, or Firm*—Staas & Halsey

[57] ABSTRACT

An output waveform control device generates a pulse wave by processing waveform data from a CNC (Computer Numerical Control) unit and delivers the pulse wave for pulsed oscillation of a laser beam. The waveform data transferred from the CNC (Computer Numerical Control) unit is input to a duration-allocating device provided within a laser oscillator. The duration-allocating device of the laser oscillator allocates a duration $\Delta T$, set to a desired value, to each step of the waveform data W. The durations $\Delta T$ are allocated in a shorter-to-longer order, and the resulting waveform data is transferred to a pulse wave-generating device. The pulse wave-generating device generates a pulse wave P1 based on the received waveform data W. The pulse wave P1 thus generated is preferably includes 20 pulse segments, each of which has a duration $\Delta T$ allocated thereto which can vary from one segment to another. Accordingly, each pulse segment of the pulse wave P1 has a duration set as desired, and the pulse wave duration $\Sigma \Delta T$ as a total of the durations $\Delta T$, can be set as desired. This makes it possible to carry out laser beam machining in a suitable manner dependent on the type of machining.

9 Claims, 5 Drawing Sheets

WAVEFORM DATA W

| STEP | I (A) |
|------|-------|
| 1 | ✽✽✽ |
| 2 | ✽✽✽ |
| 3 | ✽✽✽ |
| 4 | ✽✽✽ |
| 5 | ✽✽✽ |
| 6 | ✽✽✽ |
| 7 | ✽✽✽ |
| 8 | ✽✽✽ |
| 9 | ✽✽✽ |
| 10 | ✽✽✽ |
| 11 | ✽✽✽ |
| 12 | ✽✽✽ |
| 13 | ✽✽✽ |
| 14 | ✽✽✽ |
| 15 | ✽✽✽ |
| 16 | ✽✽✽ |
| 17 | ✽✽✽ |
| 18 | ✽✽✽ |
| 19 | ✽✽✽ |
| 20 | ✽✽✽ |

FIG. 2

| STEP | ΔT(msec) | ΣΔT(msec) |
|---|---|---|
| 1 | 0.1 | 0.1 |
| 2 | 0.1 | 0.2 |
| 3 | 0.1 | 0.3 |
| 4 | 0.1 | 0.4 |
| 5 | 0.2 | 0.6 |
| 6 | 0.2 | 0.8 |
| 7 | 0.2 | 1.0 |
| 8 | 0.2 | 1.2 |
| 9 | 0.2 | 1.4 |
| 10 | 0.2 | 1.6 |
| 11 | 0.4 | 2.0 |
| 12 | 0.4 | 2.4 |
| 13 | 0.4 | 2.8 |
| 14 | 0.4 | 3.2 |
| 15 | 0.4 | 3.6 |
| 16 | 0.4 | 4.0 |
| 17 | 0.5 | 4.5 |
| 18 | 0.5 | 5.0 |
| 19 | 0.5 | 5.5 |
| 20 | 0.5 | 6.0 |

FIG. 3

OUTPUT WAVEFORM CONTROL DEVICE

BACKGROUND OF THE INVENTION

1. Field of the Invention

This invention relates to an output waveform control device for generating pulse waves by processing waveform data received from a CNC (Computer Numerical Control) unit and delivering the pulse waves, thereby causing a laser beam to be generated by pulsed oscillation. More particularly, this invention relates to an output waveform control device which is capable of generating a suitable laser beam by pulsed oscillation according to the type of machining, i.e. piercing, cutting, or welding.

2. Description of the Related Art

A laser beam used in a solid-state laser, such as a YAG laser, is excited by optical pumping through irradiation of a a luminous energy. The optical pumping is classified into a pulsed oscillation (in which pumping is effected in a pulsed manner) and continuous oscillation (in which pumping is continuously effected).

In the pulsed oscillation, the laser beam is generated based on the pulse waves input to a laser oscillator. The pulse waves, each of which is determined by an electric current value as a peak value of a pulse wave, a pulse duration, and a pulse repetition frequency, are delivered from an output control circuit incorporated in a power source block of the laser oscillator. The output control circuit modifies settings of the current value, the pulse duration, and the pulse repetition frequency, as determinants of the pulse waves, to thereby control the waveform of each pulse wave, which in turn controls the laser beam.

A pulse wave is formed of a predetermined number of (e.g. 20) pulse segments, each with pulse segment being set to an electric current value according to waveform data. Further, each pulse segment has a set pulse duration, and the whole duration (pulse wave duration) of one pulse wave is equal to the sum of the pulse durations of the segments. The pulse durations set to the pulse segments, respectively, are identical to each other and very short. That is, a very short duration is uniformly allocated to each pulse segment.

Thus, by allocation of a short duration to each pulse segment, the duration of each pulse wave is also short. For example, when the duration allocated to each pulse segment is equal to 0.1 msec, and the number of set pulse segments is equal to 20, the pulse wave duration is equal to 2 msec.

On the other hand, the pulse wave duration considered to be the optimum duration for piercing is short, and falls within a range of approximately 0.1 to 2.0 msec. Therefore, the pulse wave delivered from the output waveform control circuit has a shape suitable for piercing.

In contrast, in cutting and welding, a relatively long pulse wave duration is required, which falls within a range of approximately 1.0 to 10 msec. Therefore, the pulse wave delivered from the output control circuit is not necessarily suitable for cutting, or welding. To obtain a long pulse wave duration, however, since the pulse duration is uniformly allocated to each pulse segment, and the set number of pulse segments is limited, it has been impossible to increase the pulse duration.

As described above, conventional pulse wave duration control by the method of uniform allocation of an identical pulse duration to each pulse segment, can provide a laser beam suitable for piercing but cannot provide a laser beam suitable for cutting or welding. Moreover, although solid-state lasers conventionally have an application range mainly limited to piercing, there is a trend for a broadened application range of the solid-state laser. This broadend application range includes applications for cutting and welding, along with development of the technology related to the solid-state laser beam. From this point of view as well, pulse wave duration control adaptable to cutting and welding is demanded.

SUMMARY OF THE INVENTION

The present invention has been made in view of these circumstances, and an object thereof is to provide an output waveform control device which is capable of setting a pulse wave duration suitable for cutting and welding.

To attain the above object, the present invention provides an output waveform control device for generating a pulse wave by processing waveform data received from a CNC (Computer Numerical Control) unit, and delivering the pulse wave for pulsed oscillation of a laser beam, the output waveform control device comprising duration-allocating means for receiving the waveform data transferred from the CNC unit, and allocating a duration set to a desired value to each of waveform data elements constituting the waveform data, and pulse wave-generating means for generating the pulse wave based on the waveform data having the duration allocated to each of the waveform data elements thereof, and delivering the pulse wave to a laser oscillator.

The duration-allocating means allocates a duration set to a desired value to each of the waveform data elements constituting the waveform data. The pulse wave-generating means generates the pulse wave based on the waveform data having the duration allocated to each of the waveform data elements thereof, and delivers the pulse wave to a laser oscillator. Therefore, it is possible to control the duration of a pulse wave to a desired value.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 2 shows a table of waveform data;

FIG. 3 shows a table of an example of durations allocated to the FIG. 2 waveform data;

DESCRIPTION OF THE PREFERRED EMBODIMENT

The invention will now be described in detail with reference to the drawings which show an embodiment of the invention.

Figure 1:
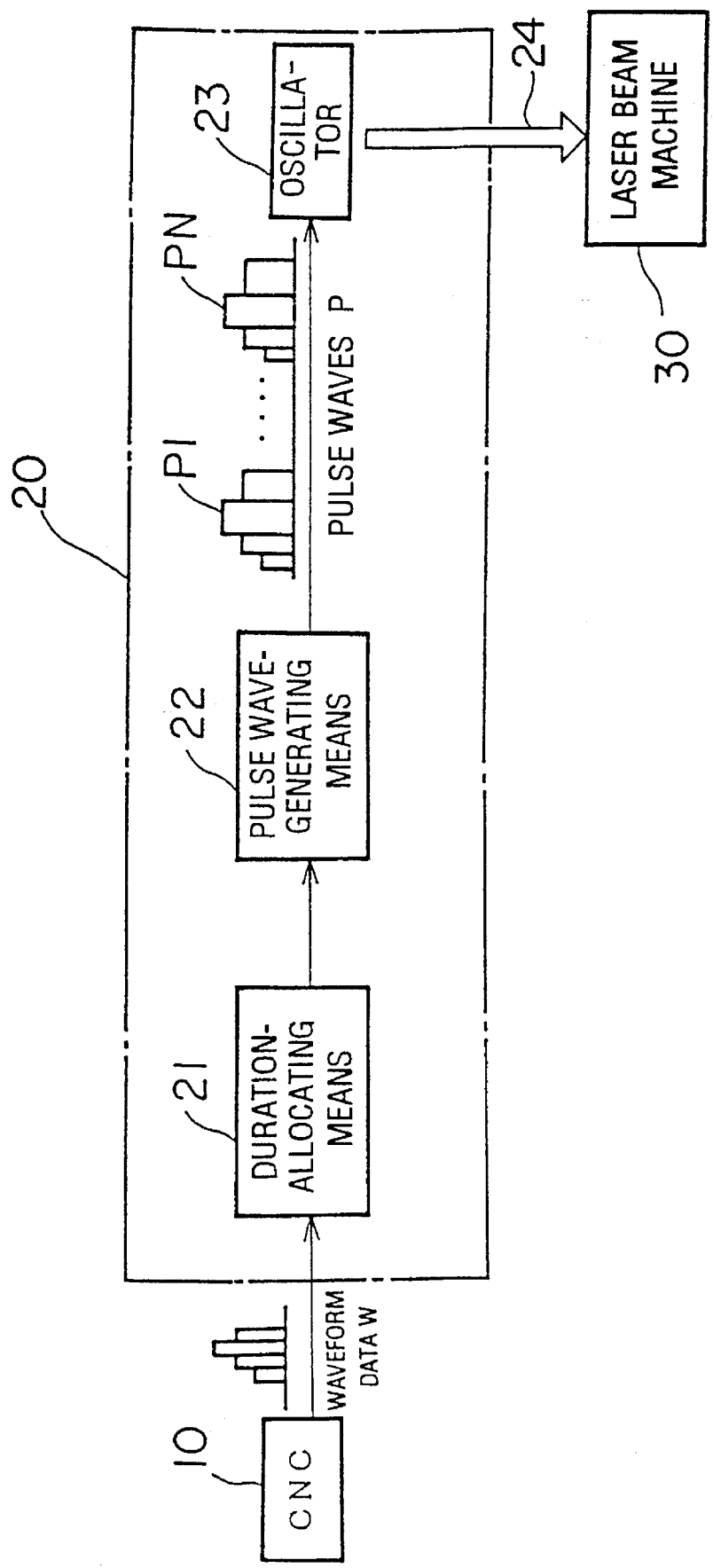
FIG. 1 is a block diagram showing the arrangement of an output waveform control device according to the invention.

FIG. 1 schematically shows the arrangement of an output waveform control device according to the invention. In the figure, waveform data transferred from a CNC (Computer Numerical Control) unit 10 is input to duration-allocating means 21 provided within a laser oscillator 20. The waveform data W is comprised of 20 steps (waveform data elements) as shown in FIG. 2, and a current value (peak value) I is set to each step of the waveform. The 20 steps form one waveform pattern as a whole. There are provided, e.g. eight patterns of the waveform data W, which are stored in the memory of the CNC unit 10 and read out to the laser oscillator 20 as occasion demands.

The duration-allocating means 21 of the laser oscillator 20 allocates a predetermined duration ΔT to each step of the waveform data W, as shown in FIG. 3. Each step of the waveform data W corresponds to a pulse segment of a pulse wave generated based on the waveform data W, as will be described hereinafter. Therefore, the duration-allocating means 21 has a function of allocating durations ΔT to these pulse segments, respectively.

The durations ΔT are allocated in the shorter-to-longer order. In FIG. 3, for example, Step 1 to Step 4 are each set to a duration of 0.1 msec, Step 5 to step 10 each to a duration of 0.2 msec, Step 11 to Step 16 each to 0.4 msec, and Step 17 to Step 20 to 0.5 msec.

Figure 4:
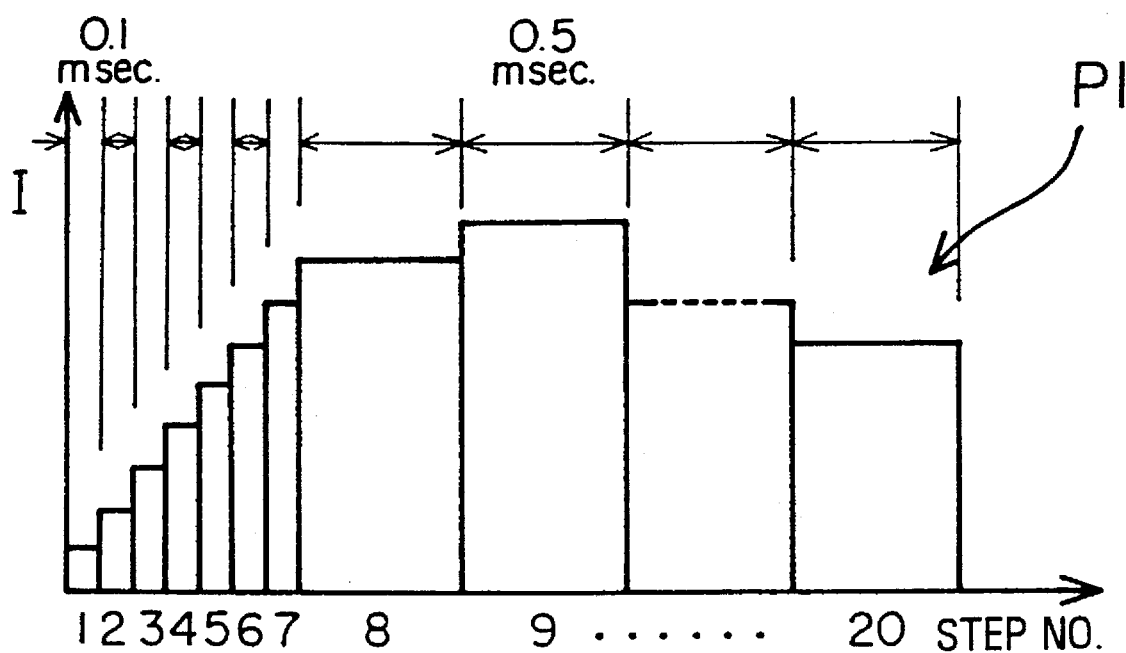
FIG. 4 is a diagram showing a shape of pulse wave taken after allocation of durations to the waveform data.

Referring again to FIG. 1, the waveform data W having the durations ΔT allocated thereto is transferred to pulse wave-generating means 22. The pulse wave-generating means 22 generates a pulse wave P1 based on the waveform data W transferred from the duration-allocating means 21. The pulse wave P1 thus generated is formed of 20 pulse segments corresponding to Steps 1 to 20, as shown in FIG. 4, with each of the pulse segments having a duration ΔT allocated thereto which can vary from one segment to another. Accordingly, the pulse segments of the pulse wave P1 each have a duration ΔT set as desired, and a total of the durations ΔT for one pulse wave, i.e. the pulse wave duration ΣΔT can be set, as desired.

For example, in an example shown in FIG. 3, the pulse wave duration ΣΔT is equal to 0.1×4+0.2×6+0.4×6+0.5×4 (msec), i.e. 6.0 msec. Assuming that the duration ΔT is set to Step 1 alone, and no duration ΔT is set to the other Steps, the minimum value of the pulse wave duration ΣΔT is equal to 0.1 msec. On the other hand, assuming that each step is set to the maximum duration of 0.5 msec, the maximum value of the pulse wave duration ΣΔT is equal to 0.5×20 (msec), i.e. 10.0 msec. Therefore, the waveform data W can cover the pulse wave duration in a range of 0.1 msec to 10.0 msec.

Figure 5:
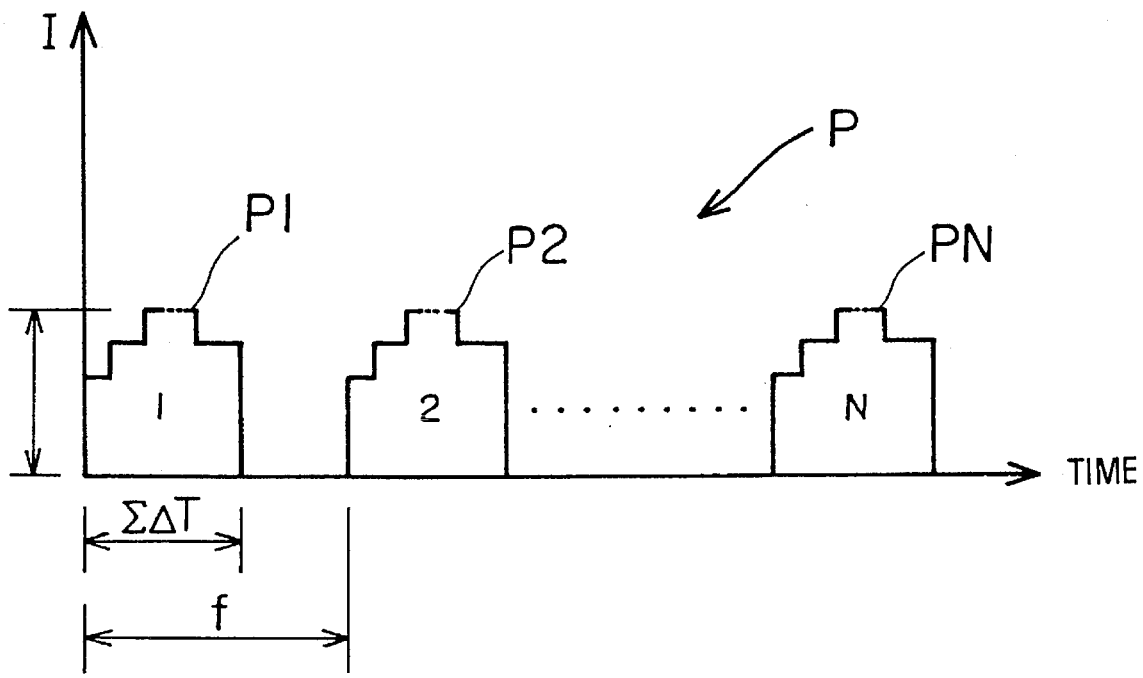
FIG. 5 is a diagram showing delivered pulse waves.

The pulse wave-generating means 22 not only generates the pulse wave P1, but also generates pulse waves P comprised of N units of the pulse wave P1 delivered at a predetermined repetition frequency f as shown in FIG. 5. The pulse waves P are delivered from the pulse wave-generating means 22 to an oscillator 23. The oscillator 23 emits a laser beam 24 generated from the pulse waves P. The laser beam 24 is irradiated onto a workpiece by a laser beam machine 30 to perform laser beam machining.

In an example FIG. 4 illustrates Step 1 to Step 7 wherein pulse wave P1 forms a unit of the pulse waves P. In this case, each of the segments has a duration ΔT set to a small value, and hence the emitted laser beam 24 acts to continually beat the workpiece. In Step 8 and Steps subsequent thereto, each pulse wave P1 has a duration set to a large value, and hence the emitted laser beam 24 acts on the workpiece as one suitable for cutting and welding. In short, Step 1 to Step 20 of the pulse wave P1, as a whole, act on the workpiece in a manner effective for cutting and/or welding, whereby cutting or welding is carried out to produce a machined product having an excellent quality.

In this way, according to the present embodiment, a duration ΔT set to a desired value is allocated to each step constituting the waveform data W, based on which pulse wave P1 is generated. This makes it possible to control the pulse wave duration of the pulse wave P1 to a desired value. Therefore, it is possible to generate a pulse wave P1 having a desired pulse wave duration in a range of a short pulse wave duration suitable for piercing to a long pulse wave duration suitable for cutting and/or welding, thereby making it possible to carry out laser beam machining in a suitable manner dependent on the type of machining.

As described heretofore, according to the present invention, a desired duration is allocated to each of a plurality of waveform data elements constituting waveform data, whereby the pulse wave is generated based on the waveform data having the desired durations thus allocated to the waveform data elements. This makes it possible to control the pulse wave duration of each pulse wave to a desired value, and hence to generate pulse waves each having a desired pulse wave duration in a range of a short pulse wave duration suitable for piercing to a long pulse wave duration suitable for cutting and/or welding, thereby making it possible to carry out laser beam machining in a suitable manner dependent on the type of machining.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An output waveform control device for processing waveform data elements received from a Computer Numerical Control unit into a pulse wave, and delivering said pulse wave to an oscillator which produces a laser beam, said output waveform control device comprising:

duration-allocating means for receiving said waveform data elements from said Computer Numerical Control unit and allocating a corresponding duration value to each of said waveform data elements; and pulse wave-generating means for receiving the waveform data elements with corresponding duration values and generating said pulse wave in response thereto, and for delivering said pulse wave to a laser oscillator.

2. An output waveform control device according to claim 1, wherein said duration-allocating means allocates duration in a shorter to longer order to said waveform data elements of said waveform data, respectively.

3. An output waveform control device according to claim 1, wherein the whole number of said waveform data elements is limited to a finite value.

4. An output waveform control device according to claim 1, wherein said laser oscillator is a YAG laser.

5. An output waveform control device comprising:

a computer numeric control device which outputs a plurality of waveform data elements;

duration-allocating means receiving the plurality of waveform data elements from the computer numeric control device and assigning a predetermined duration value to each of said waveform data elements;

pulse wave-generating means for receiving the plurality of waveform elements and corresponding predetermined duration values and for generating a pulse wave in response thereto; and an oscillator which receives the pulse wave from the pulse wave-generating means and emits a laser beam in response thereto.

6. The output waveform control device according to claim 5 wherein the pulse wave-generating means outputs a plurality of pulse waves at a predetermined frequency to the oscillator which thereby outputs a laser beam in response thereto.

7. The output waveform control device according to claim 6 wherein a first pulse wave of said plurality of pulse waves output by the pulse wave-generating means has a duration of 0.01–2 msec and a second pulse wave of said plurality of pulse waves output by the pulse wave-generating means has a duration of 1–20 msec.

8. The output waveform control device according to claim 6 wherein a first pulse wave of said plurality of pulse waves output by the pulse wave-generating means has a duration of 2 msec and a second pulse wave of said plurality of pulse waves output by the pulse wave-generating means has a duration of 20 msec.

9. An output waveform control device comprising:

duration-allocating means for receiving a plurality of waveform data elements from a computer numeric control device and selecting a duration value for each of said waveform data elements;

pulse wave-generating means for receiving the plurality of waveform elements and corresponding duration values and for generating a pulse wave in response thereto; and an oscillator which receives the pulse wave from the pulse wave-generating means and emits a laser beam in response thereto.

* * * * *